US010848525B2

(12) United States Patent
Patil et al.

(10) Patent No.: US 10,848,525 B2
(45) Date of Patent: Nov. 24, 2020

(54) SYSTEMS AND METHOD FOR SELECTION OF A USER PLANE COMPONENT FOR INTERNET PROTOCOL MULTIMEDIA SUBSYSTEM SESSIONS

(71) Applicant: Verizon Patent and Licensing Inc., Arlington, VA (US)

(72) Inventors: Sudhakar Reddy Patil, Flower Mound, TX (US); Lalit R. Kotecha, San Ramon, CA (US); Carl T. Leonard, Richardson, TX (US); Robert Avanes, Roanoke, TX (US); Violeta Cakulev, Milburn, NJ (US); Glenda T. Baloto, Antioch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 16/261,061

(22) Filed: Jan. 29, 2019

(65) Prior Publication Data
US 2020/0244710 A1 Jul. 30, 2020

(51) Int. Cl.
*H04L 29/06* (2006.01)
*H04W 80/10* (2009.01)
*H04W 88/18* (2009.01)
*H04W 60/00* (2009.01)
*H04W 8/04* (2009.01)

(52) U.S. Cl.
CPC ...... *H04L 65/1016* (2013.01); *H04L 65/1006* (2013.01); *H04L 65/1073* (2013.01); *H04W 8/04* (2013.01); *H04W 60/00* (2013.01); *H04W 80/10* (2013.01)

(58) Field of Classification Search
None
See application file for complete search history.

(56) References Cited

U.S. PATENT DOCUMENTS

| | | | | |
|---|---|---|---|---|
| 2018/0198867 A1* | 7/2018 | Dao | ................ | H04W 36/0016 |
| 2018/0262924 A1* | 9/2018 | Dao | ................ | H04W 72/1257 |
| 2019/0357301 A1* | 11/2019 | Li | ................ | H04W 40/20 |
| 2020/0154390 A1* | 5/2020 | Kim | ................ | H04W 8/26 |
| 2020/0178336 A1* | 6/2020 | Li | ................ | H04W 60/00 |
| 2020/0228189 A1* | 7/2020 | Tang | ................ | H04W 36/06 |
| 2020/0236670 A1* | 7/2020 | Xiong | ................ | H04W 72/0413 |

* cited by examiner

*Primary Examiner* — Duc T Duong

(57) ABSTRACT

Examples described herein involve an internet protocol (IP) multimedia subsystem (IMS) network. An example process may include receiving, from a user equipment (UE), a request for an IMS session. The IMS session may be between the IMS network and the UE. The process may include requesting a subscriber management component to provide platform information associated with the IMS session. The platform information may identify a platform device that hosts a user plane function (UPF) for the IMS session. The process may include receiving, from the subscriber management component, the platform information and selecting, based on the platform information, a user plane component of the IMS network. The user plane component may perform a user plane operation associated with the IMS session. The process may include causing the user plane component to perform the user plane operation for the IMS session.

20 Claims, 10 Drawing Sheets

SYSTEMS AND METHOD FOR SELECTION OF A USER PLANE COMPONENT FOR INTERNET PROTOCOL MULTIMEDIA SUBSYSTEM SESSIONS

BACKGROUND

An internet protocol (IP) multimedia subsystem (IMS) provides a platform for delivering IP multimedia services. An IMS network may utilize a session initiation protocol (SIP) to enable access to multimedia applications and/or voice applications via wired communications and/or wireless communications. A wireless communication system, such as a 5G/New Radio (5G/NR) communication system, can be communicatively coupled with an IMS network to enable communication between a user equipment (UE) and the IMS network.

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

The following detailed description of example implementations refers to the accompanying drawings. The same reference numbers in different drawings may identify the same or similar elements.

In some instances, for an internet protocol (IP) multimedia subsystem (IMS) session, an IMS network may need to be aware of locations of certain core network elements to permit the IMS network to select corresponding elements in the IMS core. For example, in previous techniques, a core network may use a packet data network gateway (PGW), and an IMS network may select optimal user plane components (e.g., platform devices of the IMS network that host user plane functions of the IMS network). In such cases, the optimal user plane components may be the user plane components that are closest (e.g., physically, topologically (a shortest network path), and/or the like) to the PGW. However, in a 5G next generation (NG) core network, a control plane and a user plane of the PGW is divided into separate functional elements (e.g., a session management function (SMF) and a user plane function (UPF), which can be separately located from each other. Such an architecture enables the 5G NG core network to provide ultra-reliable, low-latency communication (URLLC), quality of service (QoS) on a per flow basis, control and user plane separation (CUPS), and/or the like, in contrast to previous techniques.

Some implementations described herein permit an IMS network to identify a platform device associated with a UPF of a core network and select one or more user plane components based on the platform device (e.g., based on a location of the platform device). For example, as described herein, an IMS network may receive platform information from a subscriber management component (e.g., a home subscriber service (HSS), a unified data management (UDM) function (referred to herein as "UDM"), and/or an SMF of the core network) that identifies a location of the platform device that is hosting the UPF, in order to permit the IMS network to select user plane components that are nearest (e.g., physically or topologically within the IMS network). In this way, the core network and/or IMS network may coordinate to permit user plane components of the IMS network to be selected based on locations of UPFs regardless of a location of a control plane component of the core network. Accordingly, some implementations described herein may reduce latency, improve reliability, increase throughput, and/or the like for IMS sessions by enabling the use of a 5G NG core network with the IMS network.

Figure 1A:
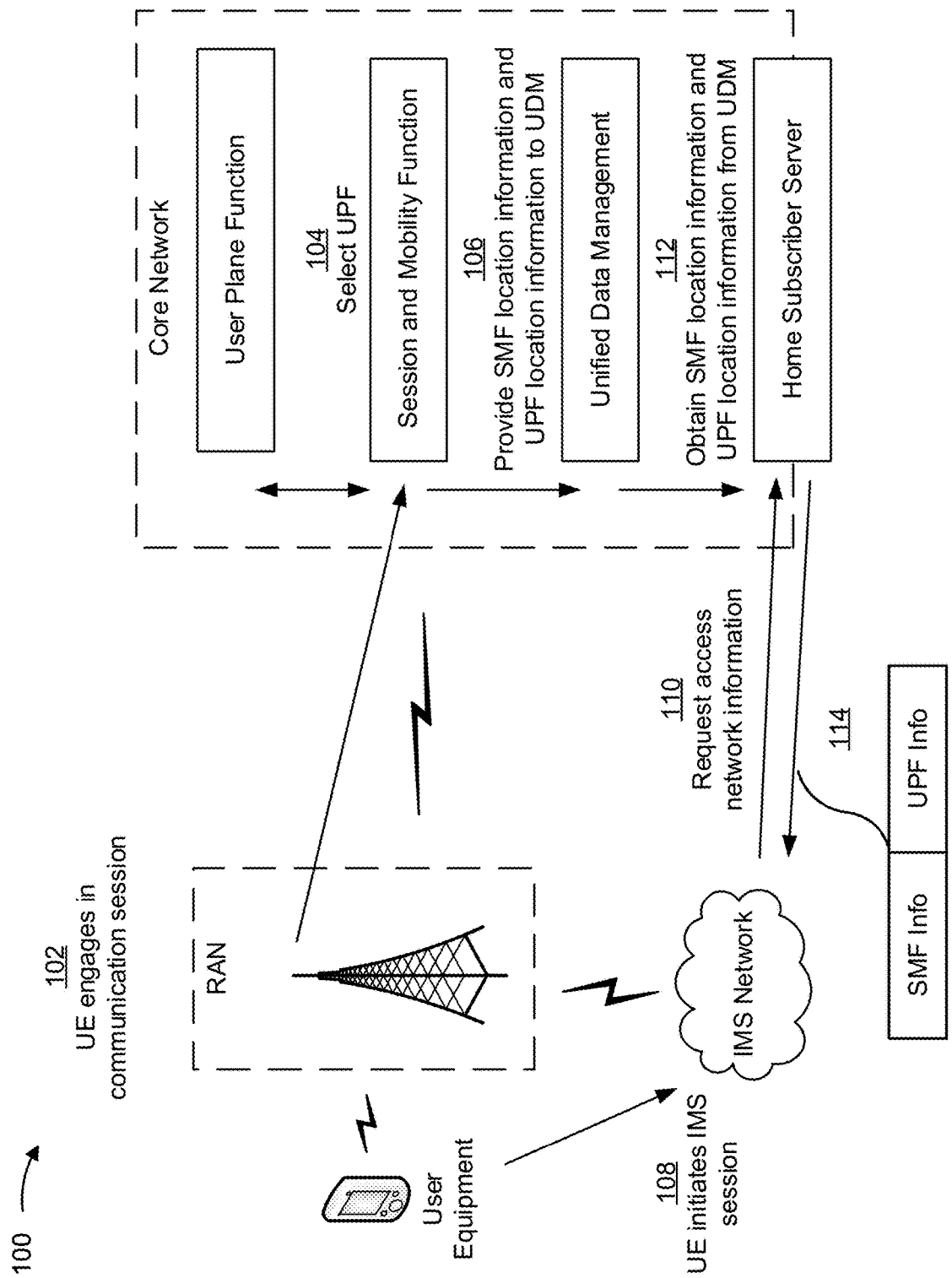
FIGS. 1A-1C is a diagram of one or more example implementations described herein.
Figure 1B:
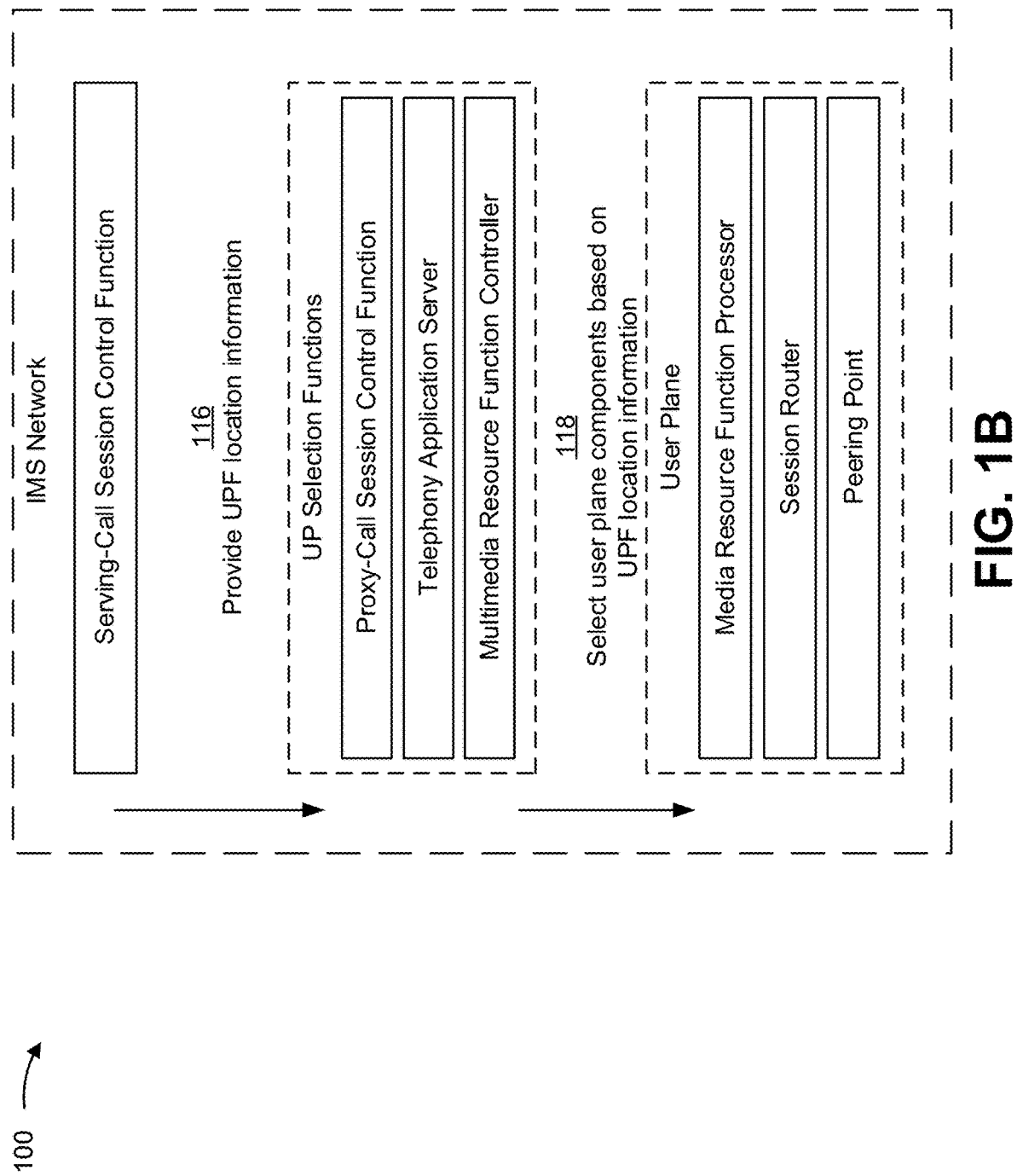
Figure 1C:
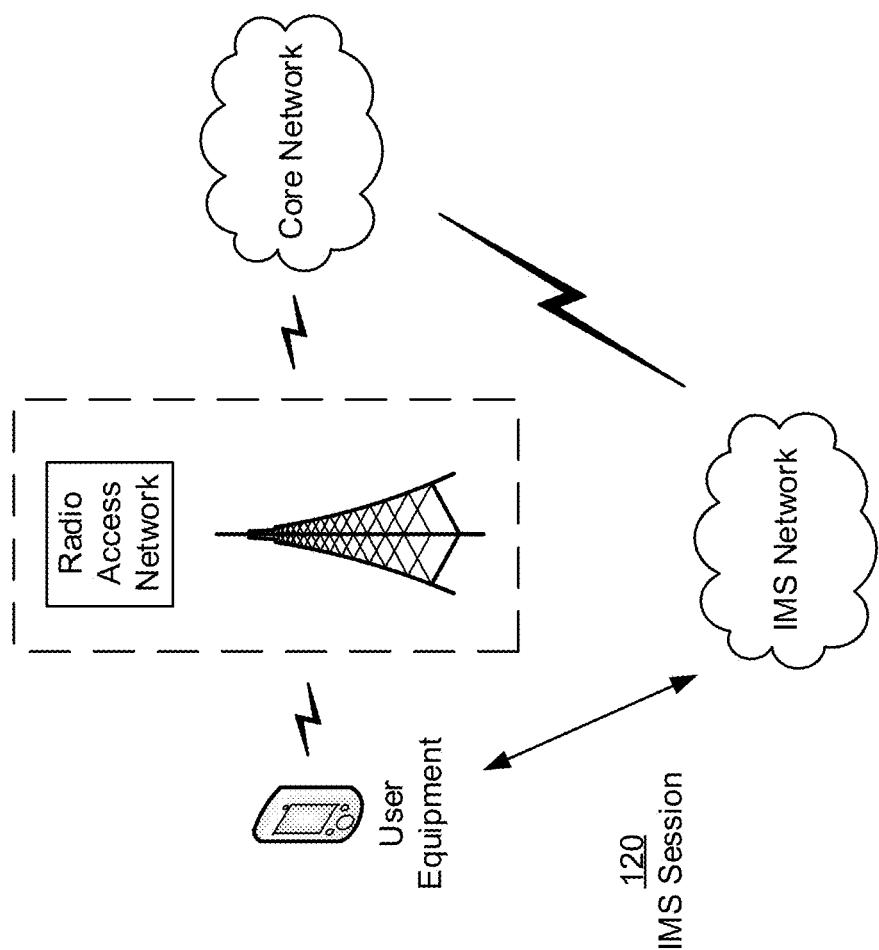

FIGS. 1A-1C are diagrams of one or more example implementations 100 described herein. Example implementation 100 illustrates various portions of a wireless telecommunications system (also referred to herein as a "wireless network"), which in some implementations can include a 5G wireless telecommunications system. Example implementation 100 can include a 5G wireless telecommunications system, a 4G wireless telecommunications system, a long-term evolution (LTE) wireless telecommunications system, an LTE-Advanced (LTE-A) wireless telecommunications system, and/or the like.

As shown in FIGS. 1A-1C, example implementation 100 can include a user equipment (UE) wirelessly connected to a radio access network (RAN) at a base station, which can be connected to a core network and an IMS network. For example, the UE can run an application that involves communicating with the IMS network, and therefore the UE can enter into a communication session (e.g., a protocol data unit (PDU) session, an IMS PDU session, and/or the like) with the IMS network via the RAN and core network. The UE, the core network, and/or the IMS network can communicate application-specific data during the communication session. In some implementations, to permit the UE to enter into the communication session with the IMS network, the UE can send an initial request to register with the core network.

The UE of example implementation 100 can be a communication and/or computing device, such as a mobile phone, a smartphone, a laptop computer, a tablet computer, an Internet of Things device, and/or the like. The base station of example implementation 100 can include an access point of a RAN, such as a 5G next generation NodeB (gNodeB or gNB), an LTE evolved NodeB (eNodeB or eNB), and/or the like. In some implementations, the base station facilitates a communication session by communicating application-specific data between the UE and the core network.

The core network of example implementation 100 can include various types of telecommunications core networks, such as a 5G next generation core network (NG Core), an LTE evolved packet core (EPC), and/or the like. As shown in FIG. 1A, the core network, among other components and/or functions, can include a UPF, an SMF, a UDM, and an HSS. In some implementations, the UPF, the SMF, the UDM, the HSS, and/or other components or functions, cannot be co-located or are not co-located (e.g., each component and/or function of the core network can be at a different location from each other component and/or function of the core network). In other words, a platform device that includes and/or hosts one of the components or functions may be separate from another platform device that includes and/or hosts one or more of the other components or functions.

The IMS network of example implementation 100 (as shown in FIG. 1B) can provide any type of IMS service. As shown in FIG. 1B, the IMS network, among other components and/or functions, can include a serving call session control function (S-CSCF), a proxy-call session control function (P-CSCF), a telephony application server (TAS), a multimedia resource function control (MRFC), and one or more user plane components (referred to individually as a "user plane component" and collectively as "user plane components"). Furthermore, the IMS network may include an HSS, and/or share an HSS with the core network (e.g., the HSS of example implementation 100). In some implementations, the S-CSCF, the P-CSCF, TAS, the MRFC, one or more of the user plane components and/or other components or functions, cannot be co-located or are not co-located (e.g., each component and/or function of the core network can be at a different location from each other component and/or function of the core network). In other words, a platform device that includes and/or hosts one of the components or functions may be separate from another platform device that includes and/or hosts one or more of the other components or functions.

As described herein, the IMS network of example implementation 100 may receive platform information (e.g., UPF information, SMF information, and/or the like) from the core network and select one or more user plane components based on the UPF information and/or SMF information. For example, the IMS network may select one or more user plane components for an IMS session based on a location of the UPF as identified in the UPF information.

As shown in FIG. 1A, and by reference number 102, the UE can engage in a communication session (e.g., a PDU session) with the core network via the RAN. For example, the UE may send a UE configuration request message to the base station of the RAN to register the UE with the core network and/or initiate the communication session between the UE and the IMS network. In some implementations, the UE may send the UE configuration request message to cause the core network to update a UPF for the communication session (e.g., based on a handoff of the UE to the base station from another base station). In such instances, the UE may send the configuration request to maintain and/or continue the communication session.

As further shown in FIG. 1A, and by reference number 104, the SMF selects a UPF for the PDU session. For example, the SMF may select the UPF according to instructions from an access and mobility function (AMF) (not shown) of the core network. The SMF may select the UPF based on information from the AMF (e.g., location information of the AMF, base station, and/or UE). When selecting the UPF, the SMF may select a platform device to host the UPF. The UPF and/or platform device may be identified via one or more identifiers. The one or more identifiers may be representative of an address and/or location of the UPF and/or platform device. In this way, the SMF may provision and/or establish the communication session for the UE.

As further shown in FIG. 1A, and by reference number 106, the SMF provides SMF location information and UPF location information to the UDM. For example, based on updating the UPF for the communication session, the SMF may be configured to forward platform information for the communication session and/or the UE. Such platform information may include the SMF location information and/or the UPF location information. The UDM may maintain the SMF location information and/or the UPF location information in a mapping of SMF information and/or UPF information for UEs communicatively coupled with the core network (e.g., using a network repository function (NRF) and/or one or more storage components or storage functions of the core network). In this way, the UDM may manage the platform information associated with the communication session and/or the UE to serve as a subscriber management component of the core network.

As further shown in FIG. 1A, and by reference number 108, the UE initiates an IMS session. For example, the UE may send an IMS session initiation protocol (SIP) registration message to the IMS network. In some implementations, an application of the UE may be configured to utilize and/or interact with one or more applications of the IMS network. In such cases, when executed, the application may cause the UE to send the SIP registration message.

As further shown in FIG. 1A, and by reference number 110, the IMS network requests access network information from the HSS. For example, the IMS network may receive the SIP registration message via the S-CSCF. Based on receiving the SIP registration message, the S-CSCF may send a request (e.g., a server assignment request (SAR) message) to the HSS to cause the HSS to provide UPF information and/or SMF information associated with the communication session and/or the UE (e.g., information that identifies locations of the UPF and SMF configured for the UE).

As further shown in FIG. 1A, and by reference number 112, the HSS obtains the SMF location information and the UPF location information from the UDM. In some implementations, the HSS may obtain the SMF location information and/or UPF location information from the UDM as platform information when the SMF updates the UDM with the platform information. Additionally, or alternatively, the HSS may obtain the platform information from the UDM based on receiving the request for the access network information from the IMS network. In this way, the HSS may serve as a subscriber management component of the core network and/or IMS network.

As further shown in FIG. 1A, and by reference number 114, the HSS provides the SMF information and/or UPF information to the IMS network. In some implementations, the SMF information and/or the UPF information may be provided as platform information that identifies a platform device associated with the SMF (e.g., a platform device that serves as the SMF and/or hosts the SMF) and that identifies a platform device associated with the UPF (e.g., a platform device that serves as the UPF and/or hosts the UPF). In this way, the HSS may provide the platform information to the core network to permit the core network to perform a user plane selection of user plane components for the IMS session with the UE.

As shown in FIG. 1B, and by reference number 116, the S-CSCF provides the UPF location information to user plane (UP) selection functions of the IMS network. For example, based on receiving the platform information, the S-CSCF may parse the platform information to identify UPF location information and forward the UPF location information to the UP selection functions. As shown, the UP selection functions may include the P-CSCF, the TAS, and the MRFC.

As described herein, the UPF location information may indicate a location of the UPF (e.g., a location of a platform device that hosts the UPF). The UPF location information (and/or SMF location information) may be provided in any suitable format (e.g., as an address (e.g., an IP address and/or network address of the core network), an identifier of the UPF (which may be mapped and/or configured to represent the location of the UPF), geolocation coordinates, and/or the like).

As further shown in FIG. 1B, and by reference number 118, the UP selection functions may select one or more user plane components based on the UPF location information. For example, each of the P-CSCF, the TAS, and/or the MRFC may be configured to select one or more user plane components for the IMS session that are nearest the UPF (e.g., nearest the platform device associated with the UPF) and/or the P-CSCF, the TAS, and/or the MRFC respectively. In other words, the UP selection functions of the IMS network may be configured to calculate, determine, and/or identify a shortest distance (or shortest route) between the UPF and the one or more user plane components. In some implementations, the P-CSCF, the TAS, and/or the MRFC may communicate and/or coordinate according to any suitable techniques to select the user plane component that is most centrally located relative to the P-CSCF, the TAS, the MRFC, and the UPF and/or equidistant to the P-CSCF, the TAS, the MRFC relative to the location of the UPF. As described herein, the S-CSCF, the P-CSCF, the TAS, the MRFC, and/or one or more other functions or components of the IMS network may be configured to calculate distances and/or determine nearest locations of user plane components relative to the UPF associated with the communication session and/or the UE.

The user plane components may be selected and configured to establish a user plane to communicate data associated with the UE via the IMS session. Accordingly, the user plane components may be configured to perform one or more user plane operations associated with the IMS session. As shown, the user plane components may include a media resource function processor (MRFP), a session router, a peering point, and/or the like. For example, the MRFP may process data (e.g., PDUs) associated with the IMS session, the session router may route the data according to the configuration of the user plane components, and the peering point may establish interconnects between user plane components (e.g., nodes) of the IMS network. In this way, the IMS network may select user plane components for the IMS session with the UE, based on UPF location information obtained from the core network.

As shown in FIG. 1C, and by reference number 120, an IMS session is established between the UE and the IMS network. As described herein, the IMS session may include communication of data between the UE and an end point of the IMS network via the UPF of the core network and the selected user plane components of the IMS network.

In this way, the IMS network may establish an IMS session with a wireless communication system that provides CUPS, URLLC, and/or the like, which can provide enhanced performance and/or communication relative to previous techniques. For example, the IMS network and/or core network of example implementation 100 may conserve computing resources and/or network resources that may otherwise be consumed by having to select user plane components based on control plane information.

The number and arrangement of devices and networks shown in FIGS. 1A-1C are provided as an example. In practice, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100.

Figure 2:
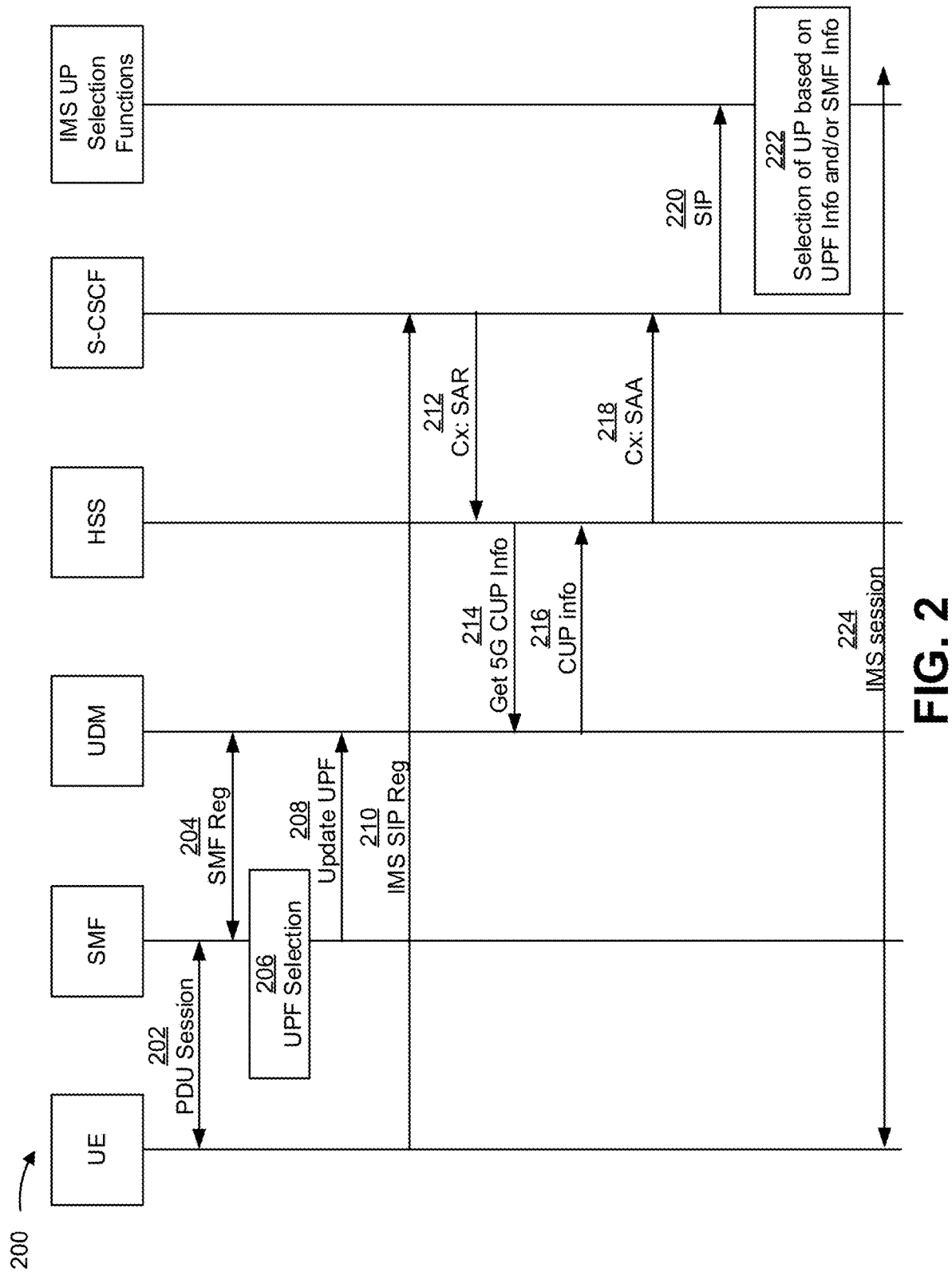
FIG. 2 is a diagram of an example implementation of a call flow described herein.

FIG. 2 is a diagram of an example implementation 200 of a call flow described herein. FIG. 2 includes a UE, an SMF, a UDM, an HSS, an S-CSCF, and a set of IMS UP selection functions. As described herein, the SMF and the UDM may be associated with a same core network, the S-CSCF and the set of IMS elements may be associated with a same IMS network, and the HSS may be a functional element of the core network and/or the IMS network.

In FIG. 2, the UE and the SMF create a PDU session via communication 202. The SMF may register the PDU session with the UE by providing to the UDM, via communication 204, SMF information associated with the PDU session. As shown by reference number 206, the SMF may perform a UPF selection. For example, the SMF may select a platform device that hosts the UPF for the PDU session and/or for one or more other communications (e.g., communications for an IMS session) for the UE. The SMF may update UPF information by sending to the UDM, via communication 208, the UPF information. The UPF information may include location information that identifies a location of a platform device that hosts the UPF. Additionally, or alternatively, the UPF information may include information that indicates that a data network name (DNN) is the name of the IMS network, that a type of the UPF is an "anchor," that the UPF information type is a fully qualified domain name (FQDN), and/or that a value of the UPF information may be the FQDN. In this way, the SMF may provide UPF information to the UDM, which may store and/or maintain the UPF information for the UE and/or the PDU session.

As further shown in FIG. 2, the UE initiates an IMS session with the S-CSCF of the IMS network via communication 210. The S-CSCF may request, via communication 212 (e.g., an SAR message), access network information for the UE. The HSS, via communication 214, may request control plane and user plane information (CUP info) from the UDM, and the UDM, via communication 216, may provide the CUP information (which may be referred to herein as "platform information") to the HSS. The CUP information may include SMF information and/or UPF information that identifies a location of the SMF and/or the UPF, respectively.

As further shown in FIG. 2, the HSS may provide, via communication 218 (e.g., an SAA message), a user profile (e.g., that includes the SMF information and/or the UPF information) to the S-CSCF. Further, as shown, the S-CSCF, via communication 220, may send a SIP message, for an IMS session, to the IMS UP selection functions (e.g., a P-CSCF, a TAS, an MRFC, and/or the like) to enable selection of one or more user plane components for an IMS session. The SIP message may include platform information for the UE and/or the IMS session (e.g., SMF information and/or UPF information). As shown by reference number 222, the IMS UP selection functions perform a UP selection of user plane components of the IMS network for the IMS session based on the UPF information and/or the SMF information. Once the user plane is configured with the selected user plane components, an IMS session 224 can be configured between the UE and IMS network.

As indicated above, FIG. 2 is provided as an example of a call flow involving communications between one or more functional elements or components of a core network and/or IMS network described herein. Other examples can differ from what is described with regard to FIG. 2.

Figure 3:
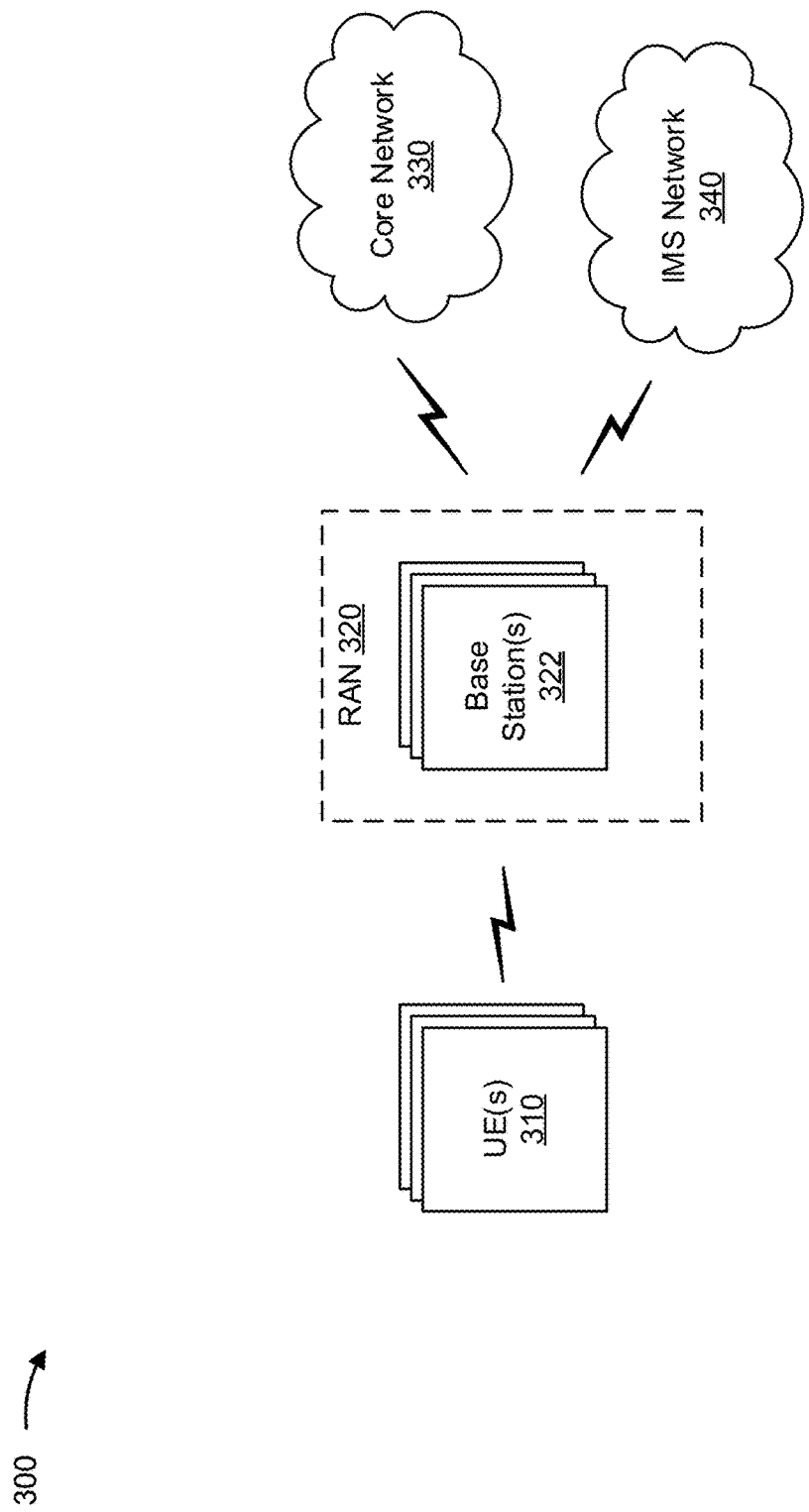
FIG. 3 is a diagram of an example environment in which systems, functional architectures, and/or methods described herein may be implemented.

FIG. 3 is a diagram of an example environment 300 in which systems and/or methods described herein may be implemented. As shown in FIG. 3, environment 300 may include one or more UEs 310 (referred to individually as "UE 310" and collectively as "UEs 310"), a RAN 320, one or more base stations 322 (referred to individually as "base station 322" and collectively as "base stations 322"), a core network 330, and/or an IMS network 340. In some implementations, example environment 300 may include one or more data networks, such as the Internet, a third-party services network, an operator services network, a private network, a wide area network, and/or the like. Devices and/or networks of environment 300 may interconnect via wired connections, wireless connections, or a combination of wired and wireless connections.

UE 310 may include one or more devices capable of communicating with base station 322 and/or a network (e.g., core network 330, IMS network 340, and/or the like). For example, UE 310 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a user device, and/or a similar device. UE 310 may be capable of communicating using uplink (e.g., UE to base station) communications, downlink (e.g., base station to UE) communications, and/or sidelink (e.g., UE-to-UE) communications. In some implementations, UE 310 may include a machine-type communication (MTC) UE, such as an evolved or enhanced MTC (eMTC) UE. In some implementations, UE 310 may include an Internet of Things (IoT) UE, such as a narrowband IoT (NB-IoT) UE and/or the like.

RAN 320 can include base station 322 and be operatively connected, via a wired and/or wireless connection, to core network 330 (e.g., through an SMF) and/or to IMS network 340 (e.g., through a UP and/or a P-CSCF). RAN 320 can facilitate communication sessions between UEs and IMS network 340 by communicating application-specific data and/or IMS specific data between RAN 320 and IMS network 340.

Base station 322 includes one or more devices capable of communicating with UE 310 using a cellular radio access technology (RAT). For example, base station 322 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 322 may transfer traffic between UE 310 (e.g., using a cellular RAT), other base stations 322 (e.g., using a wireless interface or a backhaul interface, such as a wired backhaul interface), and/or IMS network 340. Base station 322 may provide one or more cells that cover geographic areas. Some base stations 322 may be mobile base stations. Some base stations 322 may be capable of communicating using multiple RATs.

In some implementations, base station 322 may perform scheduling and/or resource management for UEs 310 covered by base station 322 (e.g., UEs 310 covered by a cell provided by base station 322). In some implementations, base stations 322 may be controlled or coordinated by a network controller, which may perform load balancing, network-level configuration, and/or the like. The network controller may communicate with base stations 322 via a wireless or wireline backhaul. In some implementations, base station 322 may include a network controller, a self-organizing network (SON) module or component, or a similar module or component. In other words, a base station 322 may perform network control, scheduling, and/or network management functions (e.g., for other base stations 322 and/or for uplink, downlink, and/or sidelink communications of UEs 310 covered by the base station 322). In some implementations, base station 322 may include a central unit and multiple distributed units (e.g., which may include multiple UPFs). The central unit may coordinate access control and communication with regard to the multiple distributed units. The multiple distributed units may provide UEs 310 and/or other base stations 322 with access to IMS network 340.

Core network 330 can include various types of core network architectures, such as a 5G NG Core (e.g., core network 400 of FIG. 4), an LTE EPC, and/or the like. In some implementations, core network 330 can be implemented on physical devices, such as a gateway, a mobility management entity, and/or the like. In some implementations, the hardware and/or software implementing core network 330 can be virtualized (e.g., through use of network function virtualization and/or software-defined networking), thereby allowing for the use of composable infrastructure when implementing core network 330. In this way, networking, storage, and compute resources can be allocated to implement the functions of core network 330 in a flexible manner, as opposed to relying on dedicated hardware and software to implement these functions.

IMS network 340 may include various types of IMS network architectures associated with providing IP multimedia services, such as media streaming, voice over IP (VoIP), rich communication services (RCS), and/or the like. IMS network may include an IMS core of a plurality of functional elements. In some implementations, IMS network 340 can be implemented on physical devices, such as a gateway, a mobility management entity, and/or the like. In some implementations, the hardware and/or software implementing IMS network 340 can be virtualized (e.g., through use of network function virtualization and/or software-defined networking), thereby allowing for the use of composable infrastructure when implementing IMS network 340. In this way, networking, storage, and compute resources can be allocated to implement the functions of IMS network 340 in a flexible manner as opposed to relying on dedicated hardware and software to implement these functions.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
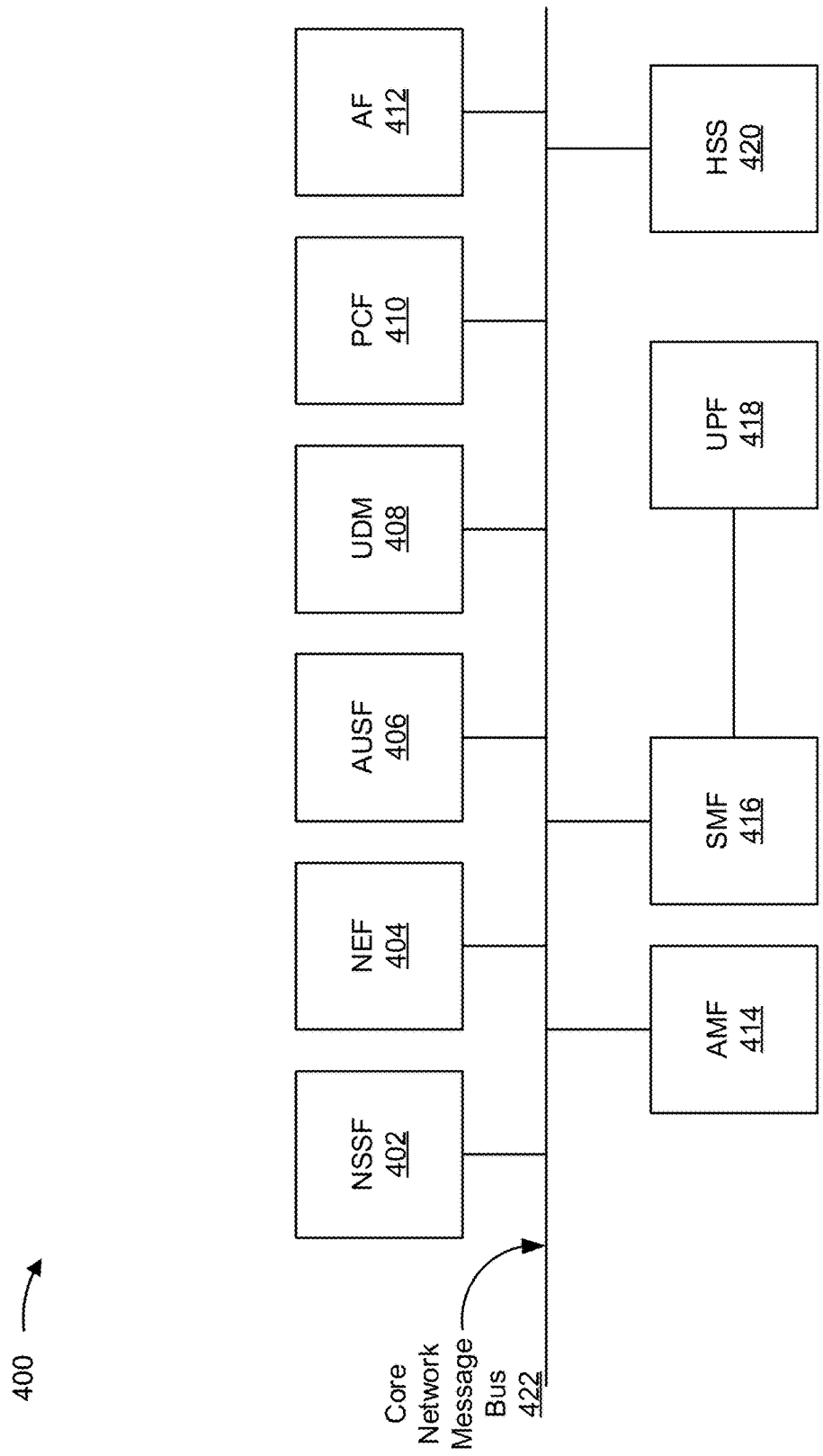
FIG. 4 is a diagram of an example functional architecture of an example core network described herein.

FIG. 4 is a diagram of an example functional architecture of a core network 400 in which systems and/or methods, described herein, can be implemented. For example, FIG. 4 can show an example functional architecture of a 5G NG core network included in a 5G wireless telecommunications system. In some implementations, the example functional architecture can be implemented by a core network (e.g., core network 330 of FIG. 3) and/or one or more devices (e.g., a device described with respect to FIG. 6). While the example functional architecture of core network 400 shown in FIG. 4 can be an example of a service-based architecture, in some implementations, core network 400 can be implemented as a reference-point architecture.

As shown in FIG. 4, core network 400 can include a plurality of functional elements. Core network 400 may correspond to core network 330, the core network described in connection with example implementation 100, and/or the core network described in connection with example implementation 200. The functional elements can include, for example, a network slice selection function (NSSF) 402, a network exposure function (NEF) 404, an authentication server function (AUSF) 406, a UDM 408, a policy control function (PCF) 410, an application function (AF) 412, an AMF 414, an SMF 416, a UPF 418, and an HSS 420. These functional elements can be communicatively connected via a core network message bus 422, which can be comprised of one or more physical communication channels and/or one or more virtual communication channels. Each of the functional elements shown in FIG. 4 may be implemented on one or more devices associated with a wireless telecommunications system. In some implementations, one or more of the functional elements can be implemented on one or more physical devices (which may be referred to herein as "platform devices"), such as an access point, a base station, a gateway, a server, and/or the like. In some implementations, one or more of the functional elements can be implemented on one or more computing devices of a cloud computing environment associated with the wireless telecommunications system. In some implementations, the core network 400 can be operatively connected to RAN 320, IMS network 340, and/or the like, via wired and/or wireless connections with UPF 418.

NSSF 402 can select network slice instances for UEs, where NSSF 402 can determine a set of network slice policies to be applied at the RAN 320. By providing network slicing, NSSF 402 allows an operator to deploy multiple substantially independent end-to-end networks potentially with the same infrastructure. In some implementations, each slice can be customized for different services. NEF 404 can support the exposure of capabilities and/or events in the wireless telecommunications system to help other entities in the wireless telecommunications system discover network services and/or utilize network resources efficiently.

AUSF 406 can act as an authentication server and support the process of authenticating UEs in the wireless telecommunications system. UDM 408 can store subscriber data and profiles in the wireless telecommunications system. UDM 408 can be used for fixed access, mobile access, and/or the like, in core network 400. UDM 408 may provide platform information (e.g., UPF information and/or SMF information) to HSS 420 to permit HSS 420 to provide the platform information to IMS network 340. PCF 410 can provide a policy and charging framework that incorporates network slicing, roaming, packet processing, mobility management, and/or the like.

AF 412 can determine whether UEs provide preferences for a set of network slice policies and support application influence on traffic routing, access to NEF 404, policy control, and/or the like. AMF 414 can provide authentication and authorization of UEs. SMF 416 can support the establishment, modification, and release of communications sessions in the wireless telecommunications system. For example, SMF 416 can configure traffic steering policies at UPF 418, enforce UE IP address allocation and policies, and/or the like. AMF 414 and SMF 416 can act as a termination point for Non-Access Stratum (NAS) signaling, mobility management, and/or the like. SMF 416 can act as a termination point for session management related to NAS. SMF 416 may provide platform information (e.g., UPF information and/or SMF information) to UDM 408 to permit UDM 408 to provide the platform information to HSS 420 and/or IMS network 340. RAN 320 can send information (e.g., the information that identifies the UE) to AMF 414 and/or SMF 416 via PCF 410.

UPF 418 can serve as an anchor point for intra/inter Radio Access Technology (RAT) mobility. UPF 418 can apply rules to packets, such as rules pertaining to packet routing, traffic reporting, handling user plane QoS, and/or the like. UPF 418 can determine an attribute of application-specific data that is communicated in a communications session. UPF 418 can receive information (e.g., the information that identifies the communications attribute of the application) from RAN 320 via SMF 416 or an API. HSS 420 may serve as and/or be a part of a subscriber management component that is configured to manage platform information for UEs 310. In some implementations, the HSS may obtain the platform information from the UDM and/or provide the platform information to IMS network 340, as described herein. Core network message bus 422 represents a communication structure for communication among the functional elements. In other words, core network message bus 422 can permit communication between two or more functional elements. Core network message bus 422 can be a communication bus, HTTP/2 proxy server, and/or the like.

RAN 320 can be operatively connected, via a wired and/or wireless connection, to the core network 400 through UPF 418. RAN 320 can facilitate communications sessions between UEs and IMS network 340 by communicating application-specific data between RAN 320 and core network 400. IMS network 340 can include various types of data networks, such as the Internet, a third-party services network, an operator services network, a private network, a wide area network, and/or the like.

The number and arrangement of functional elements shown in FIG. 4 are provided as an example. In practice, there can be additional functional elements, fewer functional elements, different functional elements, or differently arranged functional elements than those shown in FIG. 4. Furthermore, two or more functional elements shown in FIG. 4 can be implemented within a single device, or a single functional element shown in FIG. 4 can be implemented as multiple, distributed devices. Additionally, or alternatively, a set of functional elements (e.g., one or more functional elements) of core network 400 can perform one or more functions described as being performed by another set of functional elements of core network 400.

Figure 5:
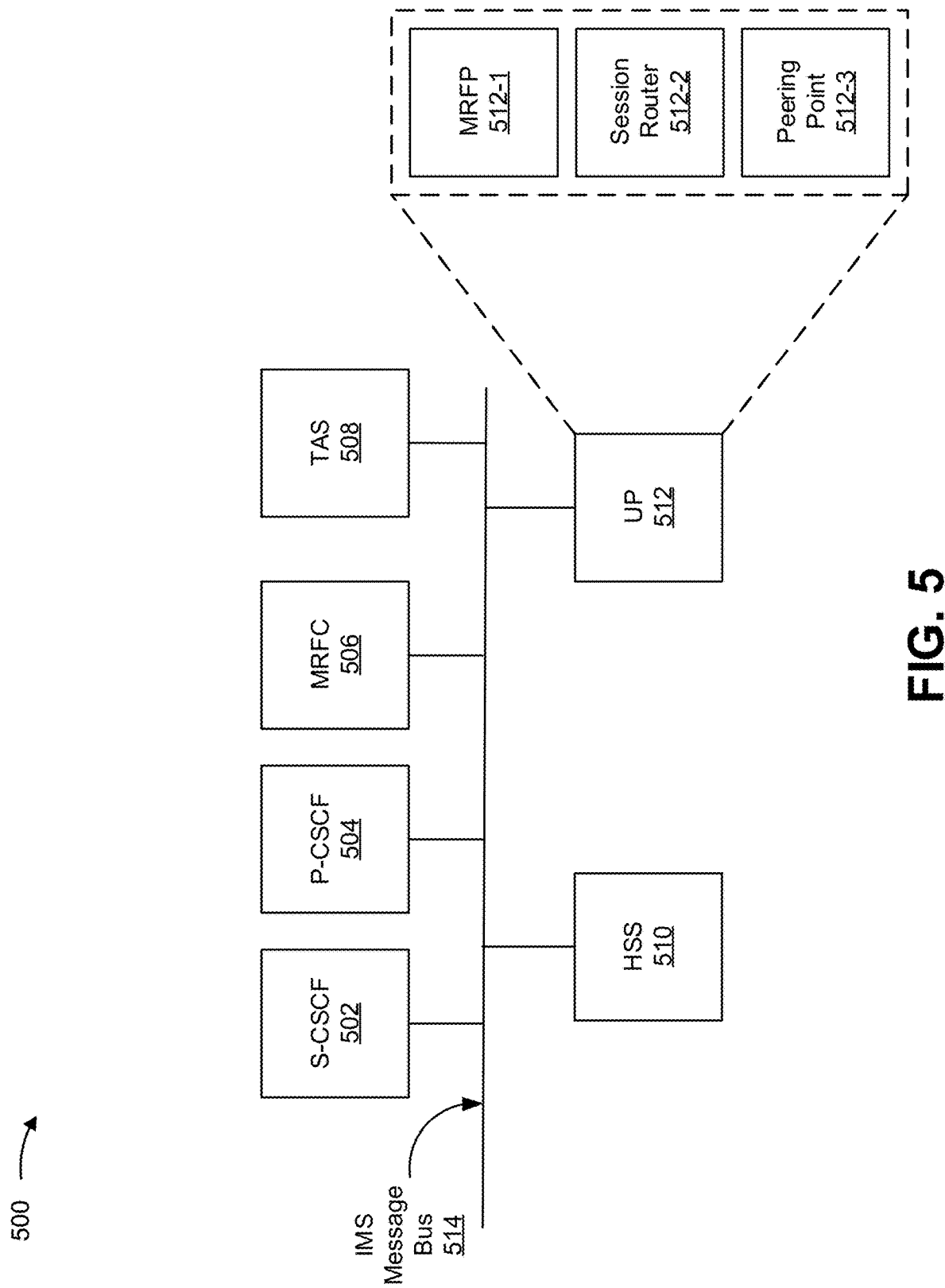
FIG. 5 is a diagram of an example functional architecture of an example IMS network described herein.

FIG. 5 is a diagram of an example functional architecture of an IMS network 500 in which systems and/or methods described herein can be implemented. For example, FIG. 5 can show an example functional architecture that can be communicatively coupled with a 5G NG core network (e.g., core network 400) included in a 5G wireless telecommunications system. While the example functional architecture of IMS network 500 shown in FIG. 5 can be an example of a service-based architecture, in some implementations, IMS network 500 can be implemented as a reference-point architecture.

As shown in FIG. 5, IMS network 500 can include a plurality of functional elements. IMS network 500 may correspond to IMS network 340, the IMS network described in connection with example implementation 100, and/or the IMS network described in connection with example implementation 200. The functional elements can include, for example, an S-CSCF 502, a P-CSCF 504, an MRFC 506, a TAS 508, an HSS 510, and a user plane 512 (shown as "UP 512"). User plane 512 can include one or more user plane components, such as MRFP 512-1, session router 512-2, and/or peering point 512-3. These functional elements can be communicatively connected via an IMS message bus 514, which can include one or more physical communication channels and/or one or more virtual communication channels. Each of the functional elements shown in FIG. 5 may be implemented on one or more devices associated with a wireless telecommunications system. In some implementations, one or more of the functional elements can be implemented on one or more physical devices (which may be referred to herein as "platform devices"), such as a router, a server, and/or the like. In some implementations, one or more of the functional elements can be implemented on one or more computing devices of a cloud computing environment associated with the wireless telecommunications system. In some implementations, the core network 400 can be operatively connected to RAN 320, core network 330, and/or the like, via wired and/or wireless connections with UPF 418.

S-CSCF 502 may serve as an interface between IMS network 500 and a core network (e.g., core network 330). For example, S-CSCF may be communicatively coupled with an HSS (e.g., HSS 420, HSS 510, and/or the like) and/or a UDM (e.g., UDM 408) of the core network. S-CSCF 502 may serve as a main SIP session control component of IMS network 500. Accordingly, S-CSCF 502 may communicate with one or more of the functional elements of IMS network 500, as described herein.

P-CSCF 504 may be communicatively coupled with a UPF (e.g., UPF 418) of the core network, receive SIP requests from a UE (e.g., UE 310), and forward the SIP requests to S-CSCF 502. MRFC 506 may serve as a signaling component that controls one or more functions and/or operations of UP 512. TAS 508 enables communication and/or access to one or more applications of IMS network 500. HSS 510 may serve as and/or be a part of a subscriber management component that is configured to receive platform information from core network 400, as described herein. In some implementations, HSS 510 may include, correspond to, and/or be associated with a subscriber location function (SLF) of IMS network 500. In some implementations, HSS 510 may correspond to HSS 420 of FIG. 4 (e.g., HSS 510 may be shared with core network 400).

UP 512 includes a plurality of user plane components of a user plane that is configured to transmit and/or receive data associated with the UE and/or an application. In example IMS network 500, UP 512 includes MRFP 512-1, session router 512-2, and peering point 512-3. MRFP 512-1 may include one or more user plane nodes that mix, source, and/or process data of IMS network 500 (e.g., media streams, VoIP, and/or the like). Additionally, or alternatively, MRFP 512-1 may manage shared access to the one or more media streams of the user plane. Session router 512-2 may include one or more user plane nodes that route the data of IMS network 500. Peering point 512-3 may include one or more user plane nodes that are configured to establish interconnects and/or data paths within the user plane of IMS network 500.

IMS message bus 514 represents a communication structure for communication among the functional elements. In other words, IMS message bus 514 can permit communication between two or more functional elements. IMS message bus 514 can be a communication bus, HTTP/2 proxy server, and/or the like.

The number and arrangement of functional elements shown in FIG. 5 are provided as an example. In practice, there can be additional functional elements, fewer functional elements, different functional elements, or differently arranged functional elements than those shown in FIG. 5. Furthermore, two or more functional elements shown in FIG. 5 can be implemented within a single device, or a single functional element shown in FIG. 5 can be implemented as multiple, distributed devices. Additionally, or alternatively, a set of functional elements (e.g., one or more functional elements) of IMS network 500 can perform one or more functions described as being performed by another set of functional elements of IMS network 500.

Figure 6:
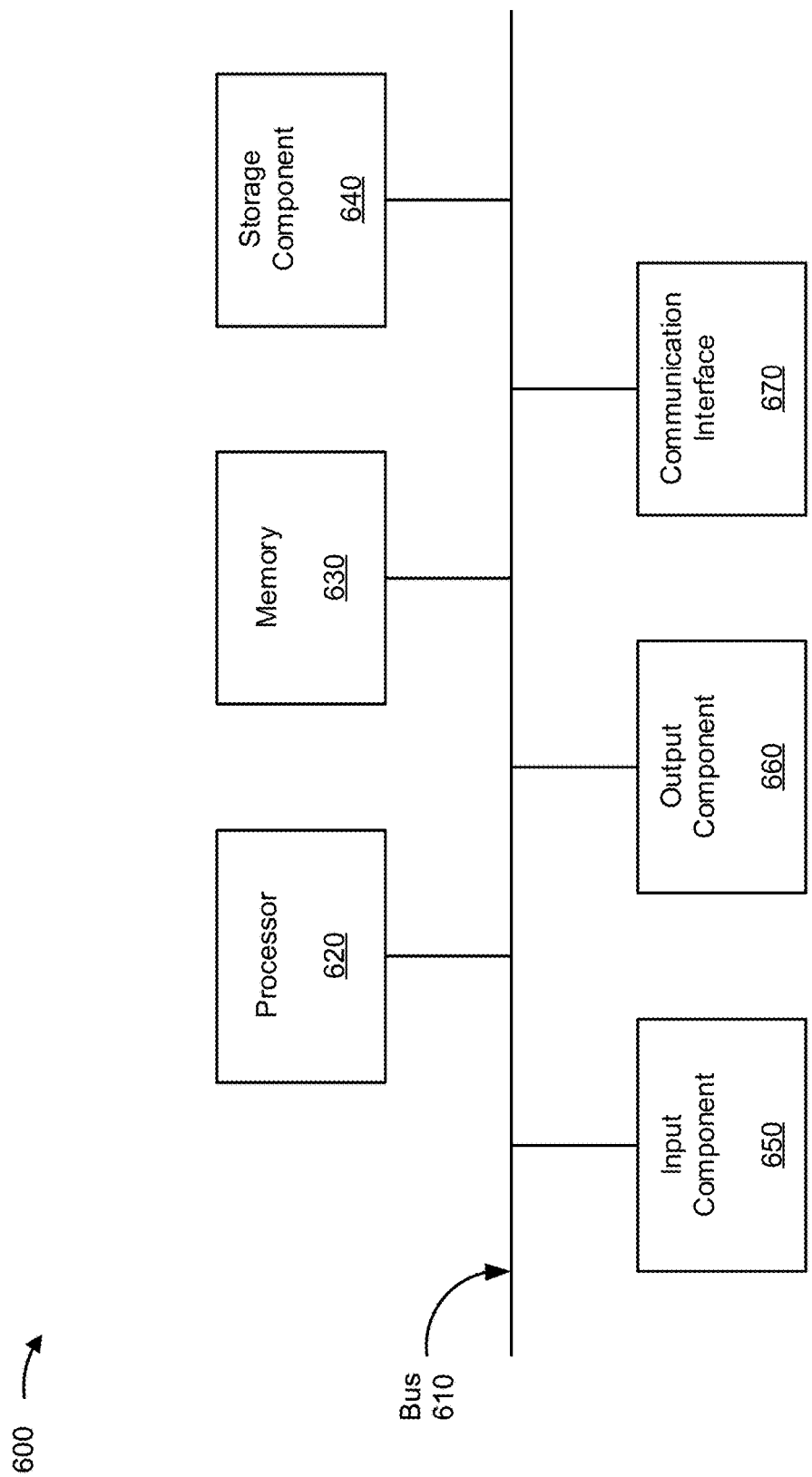
FIG. 6 is a diagram of example components of one or more devices of FIGS. 2-5.

FIG. 6 is a diagram of example components of a device 600. Device 600 may correspond UE 310, base station 322, NSSF 402, NEF 404, AUSF 406, UDM 408, PCF 410, AF 412, AMF 414, SMF 416, UPF 418, S-CSCF 502, P-CSCF 504, MRFC 506, TAS 508, UP 512, MRFP 512-1, session router 512-2, and/or peering point 512-3. In some implementations UE 310, base station 322, NSSF 402, NEF 404, AUSF 406, UDM 408, PCF 410, AF 412, AMF 414, SMF 416, UPF 418, S-CSCF 502, P-CSCF 504, MRFC 506, TAS 508, UP 512, MRFP 512-1, session router 512-2, and/or peering point 512-3, may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a wireless local area network interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
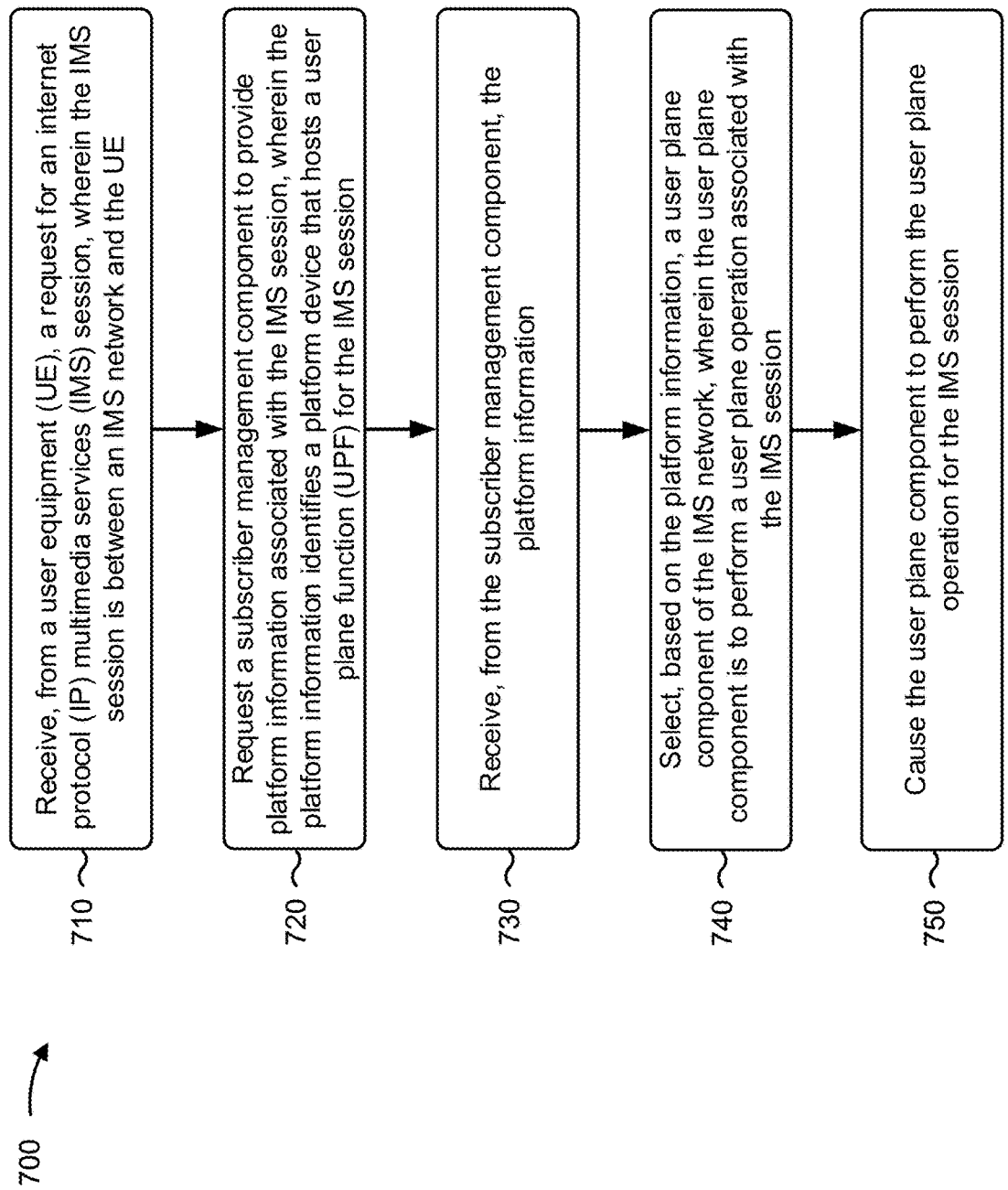
FIGS. 7-8 are flowcharts associated with one or more example processes associated with selection of a user plane component for internet protocol multimedia subsystem sessions.

FIG. 7 is a flow chart of an example process 700 associated with selection of a user plane component for internet protocol multimedia subsystem sessions. In some implementations, one or more process blocks of FIG. 7 may be performed by an IMS network (e.g., IMS network 340). In some implementations, one or more process blocks of FIG. 7 may be performed by another device or a group of devices separate from or including the IMS network, such as a UE (e.g., UE 310), a base station (e.g., base station 322), a core network (e.g., core network 330), an S-CSCF (e.g., S-CSCF 502), a P-CSCF (e.g., P-CSCF 504), a MRFC (e.g., 506), a TAS (e.g., TAS 508), a UP (e.g., UP 512), a MRFP (e.g., MRFP 512-1), a session router (e.g., session router 512-2), a peering point (e.g., peering point 512-3), and/or the like.

As shown in FIG. 7, process 700 may include receiving, from a user equipment (UE), a request for an internet protocol (IP) multimedia subsystem (IMS) session, wherein the IMS session is between an IMS network and the UE (block 710). For example, the IMS network (e.g., using a processor 620, a memory 630, a storage component 640, an input component 650, a communication interface 670, and/or the like) may receive the request for an IMS session, as described above, and, the IMS session may be between an IMS network and the UE. The request may include a SIP registration message and the IMS network may be communicatively coupled with a core network associated with the subscriber management component and a UPF of the core network.

As further shown in FIG. 7, process 700 may include requesting a subscriber management component to provide platform information associated with the IMS session, wherein the platform information identifies a platform device that hosts a UPF for the IMS session (block 720). For example, the IMS network (e.g., using a processor 620, a memory 630, a storage component 640, an input component 650, a communication interface 670, and/or the like) may send a request (e.g., an SAR message) to a subscriber management component of a core network that is configured to provide the platform information, as described above, and the platform information may identify a platform device that hosts the UPF for the IMS session, as described above.

In some implementations, the platform information identifies a location of the platform device and/or a location of a platform device that hosts an SMF for the IMS session. The platform device that hosts the SMF may be separate from the platform device that hosts the UPF. The location of the platform device may correspond to a location of the UE. Additionally, or alternatively, the user plane component is selected based on a distance between a location of the user plane component and the location of the platform device associated with the UPF. In some implementations, the user plane component is a first user plane component of a plurality of user plane components of the IMS network, and the first user plane component may be selected based on the first user plane component being within a shortest distance from the UE, relative to the plurality of user plane components.

In some implementations, the UPF and the subscriber management component may be associated with a same core network of a wireless communication system. The subscriber management component may include at least one of a unified data management component of a core network associated with the IMS network or an HSS of the core network associated with the IMS network. Additionally, or alternatively, the subscriber management component is an HSS of the core network, and the SAR message may cause the HSS to obtain the platform information from a UDM of the core network. For example, the UDM component may be configured to maintain the platform information based on the UE being registered with the core network to permit the subscriber management component to obtain the platform information from the UDM. Further, the subscriber management component may be communicatively coupled with one or more other components of the core network and the IMS network. In some implementations, the platform information is provided to a serving call state control function to indicate that the IMS session is associated with a wireless communication system that includes the SMF.

As further shown in FIG. 7, process 700 may include receiving, from the subscriber management component, the platform information (block 730). For example, the IMS network (e.g., using a processor 620, a memory 630, a storage component 640, an input component 650, and a communication interface 670, and/or the like) may receive, from the subscriber management component, the platform information, as described above.

As further shown in FIG. 7, process 700 may include selecting, based on the platform information, a user plane component of the IMS network, wherein the user plane component is to perform a user plane operation associated with the IMS session (block 740). For example, the IMS network (e.g., using a processor 620, a memory 630, a storage component 640, an input component 650, a communication interface 670, and/or the like) may select, based on the platform information, a user plane component of the IMS network, as described above. The user plane component may perform the user plane operation associated with the IMS session.

In some implementations, the user plane component is selected based on the location of the platform device associated with the UPF and a location of the user plane component. The user plane component may include one or more of an MRFP, a session router, or a peering point of the IMS network. Accordingly, the user plane operation may include processing user plane data of the IMS session, routing user plane data of the IMS session, performing peering for a user plane of the IMS session, and/or the like.

As further shown in FIG. 7, process 700 may include causing the user plane component to perform the user plane operation for the IMS session (block 750). For example, the IMS network (e.g., using a processor 620, a memory 630, a storage component 640, an output component 660, a communication interface 670, and/or the like) may cause the user plane component to perform the user plane operation for the IMS session, as described above. In some implementations, the platform information can be forwarded to one or more control components of the IMS network to permit the user plane component to perform the user plane operation in accordance with the one or more control components.

Process 700 may include additional implementations, such as any single implementation or any combination of implementations described in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
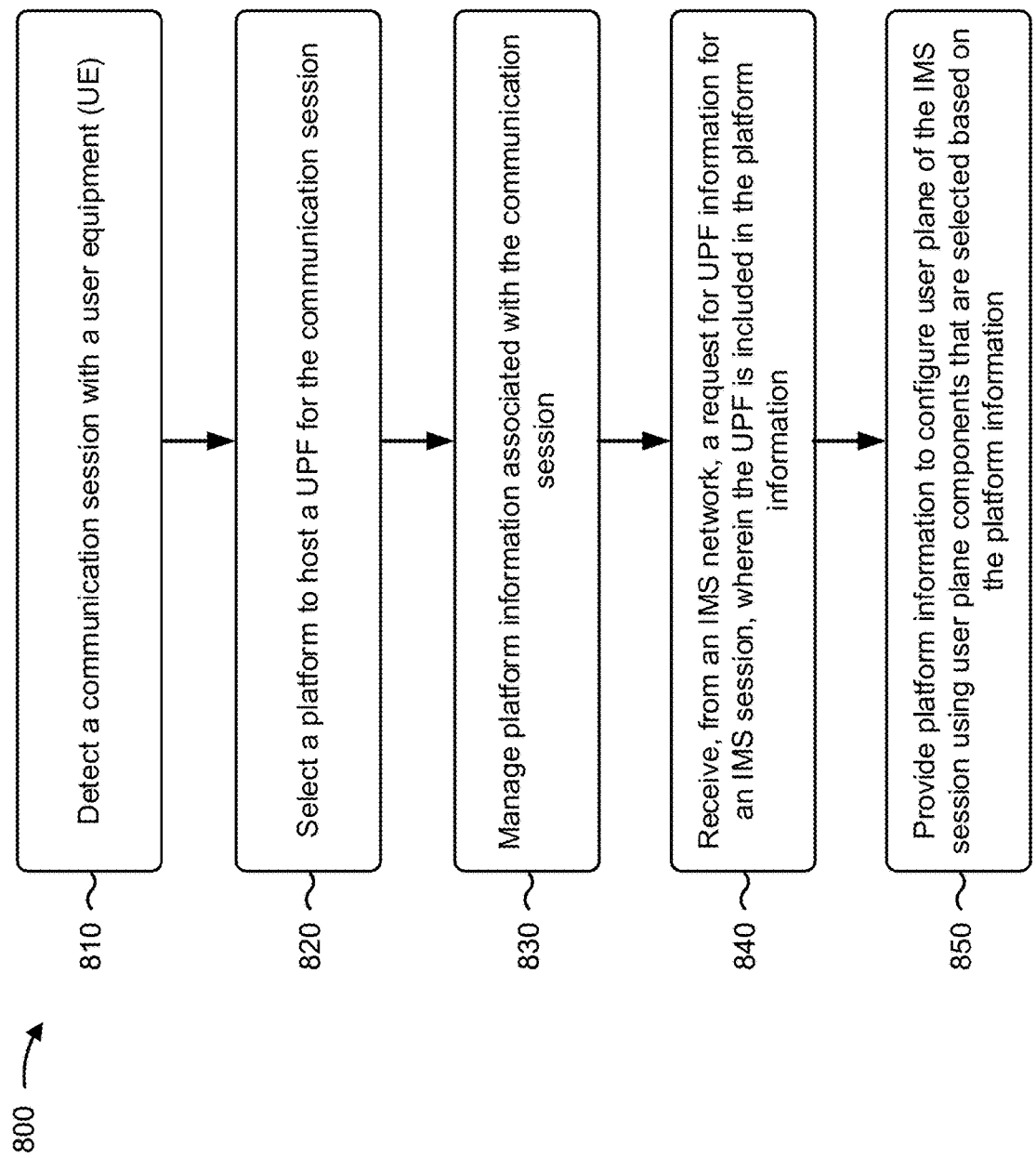

FIG. 8 is a flow chart of an example process 800 associated with selection of a user plane component for internet protocol multimedia subsystem sessions. In some implementations, one or more process blocks of FIG. 8 may be performed by a core network (e.g., core network 330). In some implementations, one or more process blocks of FIG. 8 may be performed by another device or a group of devices separate from or including a core network (e.g., core network 330), such as a UE (e.g., UE 310), a RAN (e.g., RAN 320), a base station (e.g., base station 322), an NSSF (e.g., NSSF 402), an NEF (e.g., NEF 404), an AUSF (e.g., AUSF 406), a UDM (e.g., UDM 408) a PCF (e.g., PCF 410), an AF (e.g., AF 412), an AMF (e.g., AMF 414), an SMF (e.g., 416), a UPF (e.g., UPF 418), an IMS network (e.g., IMS network 340), and/or the like.

As shown in FIG. 8, process 800 may include detecting a communication session with a UE (block 810). For example, the core network (e.g., using a processor 620, a memory 630, a storage component 640, an input component 650, a communication interface 670, AMF 414, UDM 408, SMF 416, and/or the like) may detect a communication session with a UE, as described above.

As further shown in FIG. 8, process 800 may include selecting a platform to host a UPF for the communication session (block 820). For example, the core network (e.g., using a processor 620, a memory 630, a storage component 640, an input component 650, a communication interface 670, UDM 408, SMF 416, and/or the like) may select a platform to host a UPF for the communication session, as described above.

As further shown in FIG. 8, process 800 may include managing platform information associated with the communication session (block 830). For example, the core network (e.g., using a processor 620, a memory 630, a storage component 640, an input component 650, and output component 660, a communication interface 670, UDM 408, SMF 416, and/or the like) may provide and/or store the platform information (e.g., UPF location information and SMF location information) using a UDM associated with the communication session, as described above.

As further shown in FIG. 8, process 800 may include receiving, from an IMS network, a request for UPF information for an IMS session, wherein the UPF information is included in the platform information (block 840). For example, the core network (e.g., using a processor 620, a memory 630, a storage component 640, an input component 650, a communication interface 670, UDM 408, SMF 416, and/or the like) may receive, from the IMS network, a request for UPF information for an IMS session, as described above.

As further shown in FIG. 8, process 800 may include providing platform information to configure a user plane of the IMS session using user plane components that are selected based on the platform information (block 850). For example, the core network (e.g., using a processor 620, a memory 630, a storage component 640, an output component 660, a communication interface 670, UDM 408, SMF 416, and/or the like) may provide platform information to configure the user plane of the IMS session using user plane components that are selected based on the platform information, as described above.

Process 800 may include additional implementations, such as any single implementation or any combination of implementations described in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a session initiation protocol (SIP) registration message for an internet protocol (IP) multimedia subsystem (IMS) session,
      wherein the IMS session is between an IMS network and a user equipment (UE);
   sending, by the device, a server assignment request (SAR) message to a subscriber management component to provide platform information associated with the IMS session,
      wherein the platform information identifies:
         a location of a platform device associated with a user plane function (UPF) for the IMS session, and
         a location of a platform device associated with a session management function (SMF) for the IMS session;
   receiving, by the device and from the subscriber management component, the platform information;
   selecting, by the device and based on the platform information, a user plane component of the IMS network,
      wherein the user plane component is to perform a user plane operation associated with the IMS session; and
   configuring, by the device, the user plane component to perform the user plane operation for the IMS session.

2. The method of claim 1, wherein the user plane component is selected based on the location of the platform device associated with the UPF and a location of the user plane component.

3. The method of claim 1, wherein the user plane component comprises at least one of:
   a media resource function processor,
   a session router, or
   a peering point.

4. The method of claim 1, wherein the UPF and the subscriber management component are associated with a same core network of a wireless communication system.

5. The method of claim 1, wherein the user plane component is a first user plane component of a plurality of user plane components of the IMS network,
   wherein the first user plane component is selected based on the first user plane component being within a shortest distance from the location of the platform device associated with the UPF, relative to the plurality of user plane components.

6. The method of claim 1, wherein the subscriber management component comprises at least one of:
   a unified data management component of a core network associated with the IMS network, or
   a home subscriber server (HSS) of the core network associated with the IMS network.

7. The method of claim 1, further comprising:
   forwarding the platform information to one or more control components of the IMS network to permit the user plane component to perform the user plane operation in accordance with the one or more control components.

8. A device for wireless communication, comprising:
   a memory; and
   one or more processors operatively coupled to the memory, the memory and the one or more processors configured to:
      receive a session initiation protocol (SIP) message for an internet protocol (IP) multimedia subsystem (IMS) session,
         wherein the IMS session is between an IMS network and a user equipment (UE);
      send a server assignment request (SAR) message to a subscriber management component of a core network,
         wherein the subscriber management component is configured to provide platform information,
            wherein the platform information identifies a location of a platform device, of the core network, that hosts a user plane function (UPF) for the IMS session;
      receive, from the subscriber management component, the platform information;
      select, based on the platform information, a user plane component of the IMS network,
         wherein the user plane component is to perform a user plane operation associated with the IMS session; and configure the user plane component to perform the user plane operation for the IMS session.

9. The device of claim 7, wherein the platform information further identifies a location of a platform device that hosts a session management function (SMF) for the IMS session,
wherein the platform information is provided to a serving call state control function to indicate that the IMS session is associated with a wireless communication system that includes the SMF.

10. The device of claim 7, wherein the user plane component is selected based on a distance between a location of the user plane component and the location of the platform device associated with the UPF.

11. The device of claim 10, wherein the user plane component is a first user plane component of a plurality of user plane components of the IMS network, and
wherein the distance between the location of the first user plane component and the location of the platform device that hosts the UPF is a shortest distance between the platform device associated with the UPF and each of the plurality of user plane components.

12. The device of claim 8, wherein the subscriber management component comprises a home subscriber server (HSS) of the core network, and wherein the SAR message is configured to:
cause the HSS to obtain the platform information from a unified data management (UDM) of the core network.

13. The device of claim 7, wherein the user plane component comprises at least one of:
a media resource function processor,
a session router, or
a peering point.

14. The device of claim 7, wherein the subscriber management component is communicatively coupled with one or more other components of the core network and the IMS network.

15. A non-transitory computer-readable medium storing one or more instructions for wireless communication, the one or more instructions comprising:
one or more instructions that, when executed by one or more processors, cause the one or more processors to:
receive, from a user equipment (UE), a request for an internet protocol (IP) multimedia subsystem (IMS) session,
wherein the IMS session is between an IMS network and the UE;
request a subscriber management component to provide platform information associated with the IMS session,
wherein the platform information identifies a platform device that hosts a user plane function (UPF) for the IMS session;
receive, from the subscriber management component, the platform information;
select, based on the platform information, a user plane component of the IMS network,
wherein the user plane component is to perform a user plane operation associated with the IMS session; and
cause the user plane component to perform the user plane operation for the IMS session.

16. The non-transitory computer-readable medium of claim 15, wherein the subscriber management component is associated with a unified data management (UDM) component of a core network,
wherein the UDM component is configured to maintain the platform information based on the UE being registered with the core network, and
wherein the subscriber management component is configured to obtain the platform information from the UDM component.

17. The non-transitory computer-readable medium of claim 15, wherein the IMS network is communicatively coupled with a core network associated with the subscriber management component and the UPF.

18. The non-transitory computer-readable medium of claim 15, wherein the platform information further identifies a platform device that hosts a session management function (SMF),
wherein the platform device that hosts the SMF is separate from the platform device that hosts the UPF, and
wherein the user plane component is selected based on a location of the platform device that hosts the UPF.

19. The non-transitory computer-readable medium of claim 15, wherein the user plane component is selected based on a location of the platform device that hosts the UPF.

20. The non-transitory computer-readable medium of claim 15, wherein the user plane operation comprises at least one of:
processing user plane data of the IMS session,
routing user plane data of the IMS session, or
performing peering for a user plane of the IMS session.

* * * * *